United States Patent
Nooren et al.

(10) Patent No.: US 12,150,081 B2
(45) Date of Patent: Nov. 19, 2024

(54) SEAMLESS ROAMING FOR EDGE COMPUTING WITH DUAL CONNECTIVITY

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Pieter Nooren, Delft (NL); Sjors Braam, Utrecht (NL); Toni Dimitrovski, Boskoop (NL)

(73) Assignees: KONINKLIJKE KPN N.V., Rotterdam (NL); NEDERLANDSE ORGANISATIE VOOR TOEGEPAST-NATUURWETEN-SCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 18/706,308

(22) PCT Filed: Oct. 31, 2022

(86) PCT No.: PCT/EP2022/080320
§ 371 (c)(1),
(2) Date: Apr. 30, 2024

(87) PCT Pub. No.: WO2023/078814
PCT Pub. Date: May 11, 2023

(65) Prior Publication Data
US 2024/0334364 A1  Oct. 3, 2024

(30) Foreign Application Priority Data
Nov. 4, 2021  (EP) .................................... 21206457

(51) Int. Cl.
*H04W 60/00*  (2009.01)
*H04L 67/00*  (2022.01)

(52) U.S. Cl.
CPC ........... *H04W 60/005* (2013.01); *H04L 67/34* (2013.01)

(58) Field of Classification Search
CPC .......................... H04W 60/005; H04L 67/34
See application file for complete search history.

(56) References Cited

U.S. PATENT DOCUMENTS

2019/0394672 A1 * 12/2019 Mukherjee .............. H04L 47/20
2021/0058489 A1 *  2/2021 Kim ..................... H04L 67/1031
(Continued)

FOREIGN PATENT DOCUMENTS

WO   WO-2022105807 A1 *  5/2022

OTHER PUBLICATIONS

"MEC in 5G networks," ETSI White Paper No. 28, First edition, Jun. 2018, 28 pages.
(Continued)

*Primary Examiner* — Joseph E Dean, Jr.
(74) *Attorney, Agent, or Firm* — Hamilton, Brook, Smith & Reynolds, P.C.

(57) ABSTRACT

A client device (CLD) for a mobile network may comprise two radios (R-1, R-2) for establishing simultaneous mobile data connections to at least two mobile networks, for example at a country border at which the client device leaves the network range of one mobile network and enters the network range of another. The client device may further be configured to utilize an edge application service (EDG-APP) of a mobile network. To coordinate the switch in connectivity and edge utilization between such different mobile pp networks, a client function (CDCF) may be provided in the client device while separate instances of a network function (EDCF) may be provided in each edge enabling platform of each mobile network. Together, the CDCF and the EDCFs may orchestrate the migration of the edge application ser- (Continued)

vice between the mobile networks, in a manner which respects the requirements for separation of concerns, e.g., between a mobile network's operator and an application service provider (ASP).

16 Claims, 6 Drawing Sheets

(56) References Cited

U.S. PATENT DOCUMENTS

2022/0361270 A1* 11/2022 Cai ............... H04W 60/005
2024/0064683 A1* 2/2024 Salkintzis ............ H04W 60/00

OTHER PUBLICATIONS

Velez, G., Martín, Á., Pastor, G., & Mutafungwa, E. (2020). 5G beyond 3GPP release 15 for connected automated mobility in cross-border contexts. Sensors, 20(22), 6622.

Operator Platform Concept—Phase 1: Edge Cloud Computing, Jan. 2020, GSMA.
Operator Platform Telco Edge Requirements, Version 1.0, Jun. 30, 2021, GSMA.
3GPP Ts 23.558 V1.1.0 (Oct. 2020), Technical Specification, 3rd Generation Partnership Project; Technical Specification Group Services and System Aspects; Architecture for enabling Edge Applications; (Release 17).
3GPP A Global Initiative Technical Report: 3GPP TR 23.758, V17.0.0 (Dec. 2019), 3rd Generation Partnership Project: Technical Specification Group Services and System Aspects; Study on application architecture for enabling Edge Applications; Release 17, 113 pages.
Govindaraj, K., et al., "Container Live Migration for Latency Critical Industrial Applications on Edge Computing", 2018 IEEE 23rd International Conference on Emerging Technologies and Factory Automation (ETFA), vol. 1, Oct. 25, 2018, pp. 83-90.
International Search Report and Written Opinion for Int'l Applicaiton No. PCT/EP2022/080320, Date of Mailing: Feb. 22, 2023, 11 pages.
European Search Report for European Application No. 21206457.0, Dated: May 3, 2022, 9 pages.

* cited by examiner

SEAMLESS ROAMING FOR EDGE COMPUTING WITH DUAL CONNECTIVITY

This application is the U.S. National Stage of International Application No. PCT/EP2022/080320, filed on Oct. 31, 2022, which designates the U.S., published in English, and claims priority under 35 U.S.C. § 119 or 365(c) to European Application No. 21206457.0, filed on Nov. 4, 2021. The entire teachings of the above applications are incorporated herein by reference.

TECHNICAL FIELD

The invention relates to a client device for a mobile network which comprises at least two radios for establishing simultaneous mobile data connections to at least two mobile networks and which is configured to utilize an edge application service provided by an edge application server in an edge of a mobile network, and to a method for use with the client device. The invention further relates to a network node and to system of network nodes configured to establish an instance of a network function in a mobile network, and to a method for use with the network node or system of network nodes. The invention further relates to a computer-readable medium comprising data for causing a processor system to perform any of the methods.

BACKGROUND

Multi-access Edge Computing (MEC) [1], or in short edge computing, is a computing paradigm where compute nodes may be located relatively close to a client device, for example at an edge of a mobile network. Such compute nodes may therefore also be referred to as edge nodes or simply as edges, and their location may enable higher-bandwidth, lower-latency, and higher-reliability connectivity to client devices. Edge computing is often seen as an enabler for applications with high computing and bandwidth resource remands, including real-time data processing for autonomous driving and high-definition extended reality streaming applications.

More specifically, edge computing techniques may be employed by application service providers (ASPs, also referred to as application providers, AP) to deliver application functionality and associated services across a network. In such ASP/AP-arranged edge computing, a client device may execute a client application of the application provider, while an edge application server may be instantiated on one or a distributed system of edge nodes to provide an edge application service which can be utilized by the client application. Such an edge application service may for example process application data generated by the client application, such as captured sensor data, or process data received from other entities to be used by the client application.

A typical edge computing use case may be one where a client device may send a continuous high-bandwidth data stream to an edge node, with the edge node processing the data stream to obtain an output, e.g., an analysis result, and then transmitting the output to a cloud server or other receiving entity. For example, a lightly or uncompressed high-definition video stream may be uploaded to an edge node; the edge node may then analyze the video stream to extract metadata tags from the video stream and forward the metadata tags to the cloud server or other receiving entity, potentially along with a stronger compressed version of the video stream to impose lighter networking requirements on the backhaul network upstream of the edge node.

The edge node(s) instantiating an edge application server are typically part of, or at least connected to a mobile network, which mobile network may be managed by a mobile network operator (also referred to as 'network operator' or as 'operator').

It is known for client devices to roam between different mobile networks. Through roaming, users may not only use network services from the mobile network that the users have a subscription with (their home mobile network) but also from other mobile networks. To enable roaming, the mobile networks involved may need to be connected via so-called roaming interfaces and commercial agreements may need to be in place between the mobile network operators for wholesale charging.

So-called 'seamless roaming' is a concept within roaming. In seamless roaming, the aim is to avoid or, as a second-best approach, minimize the interruption of the mobile connectivity and the applications that make use of the connectivity during the move that a client device makes between the mobile networks. Seamless roaming is an important requirement for several classes of applications. For example, many Cooperative, Connected and Automated Mobility (CCAM) applications should work seamlessly across multiple countries. This means that the application and the mobile connectivity on which it depends on should not be interrupted when a client device crosses a country border and, as a result, needs to connect to another mobile network.

Different approaches have been proposed to achieve seamless roaming, such as inter-PLMN (Public Land Mobile Network) handovers where the move of a client device from one network to another is dealt with using similar or the same mechanisms as used for handovers between cells within a mobile network. A disadvantage of the inter-PLMN handover is that it involves a technical and management integration between the mobile networks involved, which may not always be technically or commercially feasible. Another approach is fast network reselection, where it is accepted that connectivity is lost when the client device moves out of coverage of a first mobile network and searches for and connects to a second network. Fast reselection aims at minimizing the interruption time, e.g., by providing hints to the client device on the mobile networks to search for and by starting the reselection process before the connection quality deteriorates severely. A fundamental disadvantage of the fast reselection approach is that it still leads to an interruption.

Yet another approach to achieve seamless roaming is to use dual connectivity [2], which involves a client device setting up a connection to a new mobile network while an existing connection to an earlier mobile network is still active. This way, it may be ensured that the client device remains connected, also when the client device moves out of the coverage of the earlier mobile network. Dual connectivity may require a client device to be able to setup and maintain connections to two mobile networks in parallel. This may involve the client device being provided with at least two radios (in general also referred to as 'multi radio') and with two sets of credentials, e.g., stored on two Subscriber Identity Modules (SIMs), or a single set of credentials.

Compared to inter-PLMN handover and fast reselection approaches, the dual connectivity approach may not need network integration between mobile operators and may provide seamless roaming without interruption. However, dual connectivity may be challenging in situations where seamless roaming is needed for client devices and applications that use edge computing and where edge application services should be migrated between mobile networks. Namely, there may be a requirement for 'separation of concerns' between the operator and the application provider, which may essentially require that the operator and the application provider do not know, nor need to know, about each other's internal workings, including the internal topology, physical locations of edge instances, IP addressing, etc. For example, such requirements have been put forth by the GSMA in their work on the Operator Platform (OP) [3], [4]. Such requirements may ensure that the application provider does not have to be aware of the characteristics of different mobile networks and edge platforms. However, hiding network connectivity characteristics between application providers and operators may pose a challenge for the use of dual connectivity for seamless roaming with edge computing. Namely, the information to link mobile data connections to edge application services that are to be migrated between mobile operator's edges are missing: the dual connectivity is not known at the OP level.

For example, if a client device is connected with one radio to the mobile network of operator A, moves within range of the mobile network of operator B and establishes with another radio mobile connectivity with the latter mobile network, then:

Operator A and its operator platform may not be aware of new connection from the client device to operator B, as it is in another mobile network.

Operator B and its operator platform may not be able to link the new connection from the client device to an existing connection in operator A's mobile network.

The application provider may not be aware of the role of operator B, as it may only interact with operator A.

This lack of information may hinder a seamless migration of edge application services from the mobile network of operator A to that of operator B, which in turn may hinder seamless roaming in connection with edge computing.

While the above refers to operators and their operator platforms, such problems also occur in general with edge enabling platforms of mobile networks, of which an operator platform is an example, not having access to such information.

While [2] recognizes a need for seamless roaming for edge computing with dual connectivity, it does not describe a solution. In fact, according to pg. 16 of [2], a seamless multi-access edge computing handover mechanism is currently lacking.

REFERENCES

[1] ETSI White Paper No. 28—MEC in 5G networks; First edition—June 2018, ISBN No. 979-10-92620-22-1.

[2] Velez, G., Martin, A., Pastor, G., & Mutafungwa, E. (2020). 5G beyond 3GPP release 15 for connected automated mobility in cross-border contexts. Sensors, 20(22), 6622.

[3] Operator Platform Concept—Phase 1: Edge Cloud Computing, January 2020, GSMA.

[4] Operator Platform Telco Edge Requirements, Version 1.0, 30 Jun. 2021, GSMA

SUMMARY

It may be desirable to obtain one or more client functions and network functions to support seamless roaming for edge computing with dual connectivity.

In a first aspect of the invention, a client device for a mobile network may be provided. The client device may comprise:

at least two radios for establishing simultaneous mobile data connections to at least two mobile networks;

a processor subsystem which may be configured to, using a first radio, register with a first mobile network and utilize an edge application service provided by an edge application server of an edge of the first mobile network, wherein the edge is managed by an edge enabling platform of the first mobile network;

wherein the processor subsystem may be further configured to:

i) after registering with a second mobile network using a second radio, establish a signaling connection to at least one instance of a network function which network function may be instanced as a first instance in the edge enabling platform of the first mobile network and as a second instance in an edge enabling platform of the second mobile network, wherein both instances may be configured to communicate with each other and to cooperatively orchestrate a migration of edge application services across respective mobile networks;

ii) provide a client identifier of the client device and an application identifier of the edge application service to the at least one instance of the network function to enable both instances to cooperatively prepare the migration of the edge application service for the client device from the first edge application server to a second edge application server of the second mobile network;

iii) if one or more criteria are met for switching to the second mobile network, request the at least one instance of the network function to, cooperatively with the other instance, initiate the migration to the second edge application server; and iv) after the migration has been completed, switch from utilizing the edge application service from the first edge application server to utilizing the edge application service from the second edge application server.

In a further aspect of the invention, a computer-implemented method may be provided for execution at a client device. The client device may comprise at least two radios for establishing simultaneous mobile data connections to at least two mobile networks, wherein the client device may be configured to, using a first radio, register with a first mobile network and utilize an edge application service provided by an edge application server of an edge of the first mobile network. The edge may be managed by an edge enabling platform of the first mobile network. The method may comprise, by the client device:

after registering with a second mobile network using a second radio, establishing a signaling connection to at least one instance of a network function which network function may be instanced as a first instance in the edge enabling platform of the first mobile network and as a second instance in an edge enabling platform of the second mobile network, wherein both instances may be configured to communicate with each other and to cooperatively orchestrate a migration of edge application services across respective mobile networks;

providing a client identifier of the client device and an application identifier of the edge application service to the at least one instance of the network function to enable both instances to cooperatively prepare the migration of the edge application service for the client device from the first edge application server to a second edge application server of the second mobile network;

if one or more criteria are met for switching to the second mobile network, requesting the at least one instance of the network function to, cooperatively with the other instance, initiate the migration to the second edge application server; and after the migration has been completed, switching from utilizing the edge application service from the first edge application server to utilizing the edge application service from the second edge application server.

In a further aspect of the invention, a network node or system of network nodes may be provided, which network node or system of network nodes may be configured to establish an instance of a network function for an edge enabling platform of a mobile network. The mobile network may comprise or may be connected to an edge for providing edge application services to client devices. The edge may be managed by the edge enabling platform. The network node or system of network nodes may comprise:

a network interface to the mobile network;
a processor subsystem configured to, as the network function:
receive, from a client device having at least two radios and supporting simultaneous mobile data connections to the mobile network and another mobile network, a client identifier of the client device and an application identifier of an edge application service utilized by the client device in the other mobile network;
select a part of the edge of the mobile network to host an edge application server for providing the edge application service to the client device;
establish communication with another instance of the network function in an edge enabling platform of the other mobile network;
together with the other instance of the network function, cooperatively prepare and subsequently initiate a migration of the edge application service for the client device from another edge application of the other mobile network to the edge application server of the mobile network.

In a further aspect of the invention, a computer-implemented method may be provided for execution at a network node or system of network nodes, wherein the network node or system of network nodes may be configured to establish an instance of a network function for an edge enabling platform of a mobile network. The mobile network may comprise an edge for providing edge application services to client devices. The edge may be managed by the edge enabling platform. The method may comprise, as the network function:

receiving, from a client device having at least two radios and supporting simultaneous mobile data connections to the mobile network and another mobile network, a client identifier of the client device and an application identifier of an edge application service utilized by the client device in the other mobile network;
selecting a part of the edge of the mobile network to host an edge application server for providing the edge application service to the client device;
establishing communication with another instance of the network function in an edge enabling platform in the other mobile network;
together with the other instance of the network function, cooperatively preparing and subsequently initiating a migration of the edge application service for the client device from another edge application in the other mobile network to the edge application server in the mobile network.

In a further aspect of the invention, a transitory or non-transitory computer-readable medium may be provided comprising data representing a computer program. The computer program may comprise instructions for causing a processor system to perform any given computer-implemented method described in this specification.

The above measures may involve providing a client device for a mobile network. The client device may be capable of dual connectivity, referring to the ability to simultaneously connect to two different mobile networks. For that purpose, the client device may comprise two separate radios, e.g., a first radio and the second radio. Here, the term 'radio' be short for radio communication system, which may be a hardware radio communication system (e.g., based on mixers, filters, amplifiers, modulators/demodulators, detectors, antennas) or a software radio system (also referred to as software-defined radio) or a combination of both. Accordingly, the client device may, for example at an international border between a first country and a second country, connect to a mobile network of the first country as well as to a mobile network of the second country when the client device is within network range of both mobile networks.

The client device may be configured to make use of edge computing. In edge computing, an edge application server may be instantiated on one or more edge nodes of a mobile network. Such an edge application server may for example be a software application or service which may instantiated on one edge node, or in a distributed manner on a number of edge nodes. The instantiation of edge application servers may be managed by an edge enabling platform of the mobile network. An example of an edge enabling platform is an operator platform (OP) [3], [4]. The client device may be configured to utilize an edge application service provided by the edge application server. For that purpose, the client device may be configured with an application client which may make use of the edge application service, e.g., for example using an application programming interface (API). Such edge computing is known per se, and also introduced in the background section of this specification.

As also indicated in the background section, it may be desirable extend the concept of seamless roaming to edge computing. However, the switch at the connectivity level (e.g., from one mobile network to another) and the edge application level (e.g., from one edge application server to another) may preferably be coordinated, as it may not be useful to make the switch at connectivity level before the edge application service is available at the new edge in its required state, or vice versa. At first sight, the coordination of both types of switches (connectivity and edge application) may be accomplished from for example the so-called federated OP which may comprise the OP of the first mobile network (OP 'A') and the OP of the second mobile network (OP 'B'). Both OPs may have information on client connectivity and edge utilization. Alternatively, the coordination may be performed at the application provider, whom may also have information on client connectivity and edge utilization. However, these approaches may be blocked by requirements for separation of concerns between various entities. Such requirements are for example crucial in the GSMA's OP philosophy and architectural requirements. Namely, GSMA has specific requirements for the network operators, OPs and application providers [4], resulting in them not requiring knowledge of each other's internal workings and implementation details.

To coordinate the switch in connectivity and edge utilization, and therefore to enable edge computing to be migrated seamlessly when crossing an international border, or when in any other way switching between two mobile networks, the client device and the edge enabling platforms in both mobile networks may be provided with so-called 'dual connectivity' functionality. At the client device, this dual connectivity functionality may be provided by a client function which is running on the client device, e.g., as an application or as a service, and which may elsewhere be referred to as 'client dual connectivity function' (CDCF). At each edge enabling platform (e.g., at each OP), this dual connectivity functionality may be provided by a separate instance of a network function which is accessible by the client device when connected to the respective mobile network. This network function may be running on one or more network nodes, e.g., as an application or as a service, and may elsewhere be referred to as 'edge dual connectivity function' (EDCF). The following may for sake of explanation continue to refer to CDCF and EDCF, with the understanding that the naming of the respective functions is merely exemplary and that the functionality attributed to each function does not need to be implemented as a function per se. Furthermore, the operator platform (OP) is taken as example of edge enabling platform.

Briefly speaking, the above measures may obtain independence of the application provider by providing a function, e.g., the CDCF, in the client device, which function is separate from the application client and thereby separate and independent of the application provider. By having the CDCF inform at least one of the OPs of the relation between its two mobile network connections and of the edge application service being utilized, it may not be needed for the OPs to continuously maintain information of client connectivity across different mobile networks and of which edge application services are used by which client devices. Rather, the client device's CDCF may inform the OP's EDCF on a case-by-case basis, e.g., when the client device expects a switch in connectivity to from one mobile network to another mobile network.

In particular, the CDCF and the EDCFs in the OPs of both networks, e.g., the source network and the destination network, may jointly facilitate the seamless migration of an edge application service when switching mobile networks. For that purpose, the EDCFs may communicate with each other to cooperatively orchestrate the migration. Such a cooperative approach to the orchestration of the migration may be desirable for the following reasons. Before and during the migration, access to both edges may be needed, for example to be able to identify the edge application server utilized by the client device and a destination edge application server to which the edge application service is to be migrated. An EDCF in the edge enabling platform of one mobile network may not have direct access to the edge of the other mobile network. Accordingly, an instance of the EDCF may be provided for each mobile network, with both instances together having access to the edges of both mobile networks.

Each instance may be configured to cooperate with at least one other instance to orchestrate the migration. Here, 'orchestrate' may refer to taking steps resulting in the migration being carried out but may not need to comprise the actual execution of the migration (which execution may for example involve the transfer of application data from one edge application server to another, such as application state data). In particular, the EDCFs may cooperatively prepare and initiate the migration. Here, the term 'prepare' may refer to preparatory steps to be able to initiate the migration. In particular, such steps may comprise identifying the entities involved in the migration, meaning that the EDCFs may identify and setup a communication session between each other, and cooperatively identify the source and destination edge application servers. In general, the EDCF may, as part of preparing the migration, check whether the migration is ready to be initiated, and if not, take actions to ensure that the migration is ready to be initiated, e.g., in a manner as known per se. In a specific example, this may involve a EDCF checking whether there exists a communication session between the EDCFs (and setting up such a communication session if not yet established), check the data connection between the source edge application server and the destination edge application server (and setting up such a data connection if not yet established), and/or check the availability of the software components that make up the edge application service (and setup such software components if not available). Typically, these checks may be immediately satisfied and the EDCF may be ready to 'initiate'. Nevertheless, such checks and subsequent actions may be desirable to be performed as otherwise the actual migration may inadvertently fail. Moreover, the term 'initiate' may refer to causing the migration to be carried out, for example by requesting another entity to carry out the migration.

More specifically, the CDCF may provide a client identifier of the client device and an application identifier of the edge application service to at least one of the EDCFs. The combination of client identifier and application identifier may enable the EDCFs to identify which edge application service is to be transferred. The CDCF may also determine if one or more criteria for switching to the second mobile network are met, and if so, request the EDCF(s) to cooperatively initiate the migration to the destination edge application server. Such criteria may for example comprise signal strength. The CDCF may further, after the migration has been completed, cause the client device to switch from utilizing the edge application service from the source edge application server to utilizing the edge application service from the destination edge application server. Accordingly, the CDCF may ensure that the switch in connectivity and edge application service is coordinated, in that the client device may, when expecting to switch to another mobile network, trigger the OPs to prepare and initiate the migration of the edge application service utilized by the client device by providing the client identifier and the application identifier to at least one of the OPs.

The above measures thus may have the advantage that they respect requirements for separation of concerns, e.g., from GSMA, as already elucidated above. Another advantage may be that, by having the client device coordinate the switch in connectivity and edge application service, the coordination is based on up-to-date information since the client device typically has an up-to-date view of the status of the mobile network connections, and thus of whether a switch between mobile networks is needed or expected. The above measures may also have the advantage that a client device may seamlessly roam from one mobile network to another mobile network even when utilizing an edge application service, or if entirely seamless roaming is not possible (e.g., due to the client device moving at high speed and thus quickly loosing connectivity to the first mobile network), at least with reduced or minimal interruption of the availability of the edge application service to the client device.

The following embodiments may represent embodiments of the client device and corresponding computer-implemented method performed at the client device, but may, unless otherwise precluded for technical reasons, also represent embodiments of the network node(s) and corresponding computer-implemented method where its processor subsystem is configured to perform corresponding step(s).

In an embodiment, the processor subsystem may be configured to, using the second radio, provide the client identifier and the application identifier to the second instance of the network function and to provide a first platform identifier of the edge enabling platform of the first mobile network to the second instance to enable the second instance to locate the first instance. To enable the EDCF's to cooperatively initiate the migration, the EDCF's may need to be able to establish communication with each other. Such establishment of communication may be an example or a part of what is elsewhere referred to as 'preparing' of the migration. For that purpose, the CDCF may provide a platform identifier of the edge enabling platform of the first mobile network (also referred to as 'edge enabling platform A') to the EDCF in the edge enabling platform of the second mobile network (also referred to as 'EDCF B'), thereby enabling the EDCF B to locate and thereby establish communications with the EDCF in the first mobile network (also referred to as 'EDCF A'). This may be advantageous since the client device may have simultaneous connections to both mobile networks and may, through existing mechanisms, be aware of the platform identifiers of the respective edge enabling platforms of the respective mobile networks. There may thus not be a need for the EDCFs to locate each other via separate additional mechanisms.

In general, the platform identifier may take different forms. For example, the platform identifier may be the "Operator Platform ID" or "OP ID" from [4]. Alternatively, a "Public Land Mobile Network ID" or "PLMN ID" from [5] may be used. In some embodiments, instead of an identifier for the platform, an identifier for the EDCF may be used, which may take the form of an EES ID, which may itself be unique or be made unique by combining it with the PLMN ID. These identifiers may be communicated to the client device, for example using the procedures or interfaces in [4] and [5].

In general, the client device's CDCF may provide the platform identifier of the edge enabling platform A via the second radio to the EDCF B, and/or provide the platform identifier of the edge enabling platform B via the first radio to the EDCF A.

Accordingly, in an embodiment, the processor subsystem may be configured to, using the first radio, provide the client identifier and the application identifier to the first instance of the network function and to provide a second platform identifier of the edge enabling platform of the second mobile network to the first instance to enable the first instance to locate the second instance.

Accordingly, in an embodiment, the processor subsystem may be configured to provide the client identifier and the application identifier to both instances of the network function via the respective radio.

In an embodiment, the processor subsystem may be configured to provide an anonymized or pseudonymized client identifier to the at least one instance of the network function. The client identifier may be used by the EDCF's uniquely identify the client device for the purpose of the migration of the edge application service. There may, however, not be a need for further identification of the client device, e.g., revealing privacy sensitive details. As such, for the purpose of the orchestration of the migration of the edge application service, the client device may provide an anonymized or pseudonymized client identifier to the EDCF(s), to enable the EDCFs to prepare and initiate the migration on the basis of this anonymized or pseudonymized client identifier. For example, the CDCF may provide a long-enough random string, or a hash of an IMSI, GSPI or IMEI of the client device, as the client identifier to the EDCF(s).

In an embodiment, the one or more criteria for switching to the second mobile network may include at least one of:
a geolocation of the client device;
a planned or estimated route of the client device;
whether a broadcast is received signaling a country border; and
whether a base station to which the client device is connected is known to be a base station at or within a vicinity of a country border.

It may be desirable to have the EDCFs timely initiate the migration to the second edge application server. For that purpose, it may be desirable to accurately time when to switch edge utilization from the first mobile network to the second mobile network e.g., so as not to switch too early (e.g., when the connectivity to the second mobile network is still poor or when it is not evident that the client device is actually moving towards the second mobile network) nor too late (e.g., when connectivity to the first mobile network deteriorates or is lost). As criterium, signal strength may be used, but this criterium may be combined with one or more additional criteria, which may together allow the switch in edge utilization to be timelier made, e.g., not too early and not to late. The switch in edge utilization may be linked to the switch in mobile network itself. Namely, while the client device may have dual connectivity, it may decide to switch for its data and voice connections to one of the mobile networks. So even if the client device maintains simultaneous connections to both mobile networks, it may decide to switch from utilizing the first mobile network for its data and voice connections to utilizing the second mobile network for its data and voice connections. In some embodiments, the CDCF may itself evaluate the criteria and initiate the switching, both in terms of connectivity ('primary network') and edge utilization. In other embodiments, a different function of the client device may take the role of evaluating the criteria and initiating the switching in terms of connectivity but may inform the CDCF thereof to enable the CDCF to time the switch in edge utilization.

In an embodiment, the processor subsystem may be configured to execute a client function which is configured for performing steps i) through iv), e.g., as defined by claim 1. As previously explained, the functionality of the client device which relates to the communication with the EDCFs and the timing of the switch in edge utilization may be embodied as a separate function of the client device, e.g., the CDCF. Such a function may for example be part of an operating system of the client device, e.g., part of iOS by Apple or Android by Google.

In an embodiment, the client function may be part of an edge enabler client of the client device or distributed over two or more edge enabler clients of the client device. Edge enabler clients (EECs) are known per se, and such an EEC may used by the client device to communicate with the edge enabling platform, and specifically with an edge enabler server (EES) which may be part of the edge enabling platform. The CDCF may be part of such an EEC. This may still adhere to the requirements of separation of concerns, as also the EEC is separate from the application client.

In an embodiment, the client device may be configured as one of:
- a mobile network user equipment comprising one subscriber identity module and at least two radios; or
- a combination of at least two mobile network user equipment each having one subscriber identity module and a radio, wherein the client function is configured to communicate with each mobile network user equipment.

A client of a mobile network may, according to a mobile network's standard, be represented as a user equipment (UE) which may have certain tasks towards the mobile network's core network. For example, a UE may handle mobility management, call control, session management and identity management. To establish the dual connectivity, the client device may comprise two of such UEs each having a separate radio and subscriber identity module (SIM), or in some embodiments may comprise a 'dual connectivity'-type of UE which may comprise one SIM and at least two radios.

The following embodiments may represent embodiments of the (system of) network node(s) and corresponding computer-implemented method performed at the network node(s), but may, unless otherwise precluded for technical reasons, also represent embodiments of the client device and corresponding computer-implemented method where its processor subsystem is configured to perform corresponding step(s).

In an embodiment, the processor subsystem may be configured to select the part of the edge to be in a proximity of a base station to which the client device is connected. The EDCF may, as part of preparing the migration of the edge application service, select the target edge application server, or in general, the part of the edge to which the edge application services to be migrated. As the target edge application server is preferably nearby the client device, e.g., in terms of physical proximity or network proximity (e.g., in terms of number of hops, latency, etc.), the EDCF may select the edge to be in proximity of a base station currently serving the client device.

In an embodiment, the processor subsystem may be configured to communicate with the other instance of the network function via an east-westbound interface between the mobile network and the further mobile network. The EDCFs may establish communication with each other via the so-called east-westbound interface, e.g., as defined in [3], [4]. This may allow the EDCF's to communicate each other despite being connected to different mobile networks, e.g., of different operators.

In an embodiment, the processor subsystem may be configured to:
- receive a platform identifier of the edge enabling platform of the other mobile network from the client device; and
- locate the other instance of the network function based on the platform identifier.

An EDCF may receive a platform identifier from the client device. This platform identifier may allow the EDCF to locate, and establish communication with, the other EDCF in the other mobile network, since the EDCF is typically part of the edge enabling platform identified by such a platform identifier. This may be advantageous since the client device may have simultaneous connections to both mobile networks and may, through existing mechanisms, be aware of the platform identifiers of the respective edge enabling platforms of the respective mobile networks. There may thus not be a need for the EDCFs to locate each other via separate additional mechanisms.

In an embodiment, the processor subsystem may be configured to:
- look up a platform identifier of the edge enabling platform of the other mobile network in a database on the basis of the client identifier, wherein the database may be accessible to entities outside of the mobile network and stores entries associating client identifier and platform identifier; and
- locate the other instance of the network function based on the platform identifier.

Instead of the EDCFs receiving a platform identifier of the edge enabling platform of the other EDCF from the client device, an EDCF may look up the platform identifier of the other EDCF in a database which is accessible to both EDCFs. For example, the database may be located externally to both platforms, for example on the Internet or on an infrastructure that both operator platforms have access to. The database may also be hosted by one of the platforms and made accessible from other platforms. Each EDCF may be configured to register with the database by registering the client identifier received from the client device and by registering the platform identifier of the edge enabling platform of which the EDCF is part. For example, when assuming that EDCF A has already registered with the database, EDCF B may look up the platform identifier of EDCF A's edge enabling platform and thereby establish communication with EDCF A. EDCF B may itself also registered with the database.

In an embodiment, the processor subsystem may be configured as an edge enabler server or an edge configuration server, wherein the edge enabler server or the edge configuration server may comprise the instance of the network function.

Edge enabler servers (EESs) and edge communication servers (ECSs) are known per se, and such an EES or ECS may used by an edge enabling platform to communicate with a client device, and specifically with an edge enabler client (EEC) which may be part of the client device. The EDCF may be part of such an EES or ECS. This may still adhere to the requirements of separation of concerns, as also the EES and the ECS is separate from the application provider.

In general, a system may be provided comprising at least i) a client device as defined in this specification, and ii) a network node or system of network nodes representing a network function, e.g., a EDCF, as defined in this specification. Such a system may for example be, or be part of, a communication network.

It will be appreciated by those skilled in the art that two or more of the above-mentioned embodiments, implementations, and/or aspects of the invention may be combined in any way deemed useful.

Modifications and variations of any one of the systems or devices (e.g., client device, network node(s), network function, etc.), computer-implemented methods, metadata and/or computer programs, which correspond to the described modifications and variations of another one of these systems or devices, computer-implemented methods, metadata and/or computer programs, or vice versa, may be carried out by a person skilled in the art on the basis of the present description.

Further References

[5] 3GPP TS 23.558 V1.1.0 (2020-10), Technical Specification, 3rd Generation Partnership Project; Technical Specification Group Services and System Aspects; Architecture for enabling Edge Applications; (Release 17)

[6] K. Govindaraj and A. Artemenko, "Container Live Migration for Latency Critical Industrial Applications on Edge Computing," 2018 IEEE 23rd International Conference on Emerging Technologies and Factory Automation (ETFA), Turin, 2018, pp. 83-90, doi: 10.1109/ETFA.2018.8502659.

BRIEF DESCRIPTION OF THE DRAWINGS

These and other aspects of the invention are apparent from and will be elucidated with reference to the embodiments described hereinafter. In the drawings.

Figure 1:
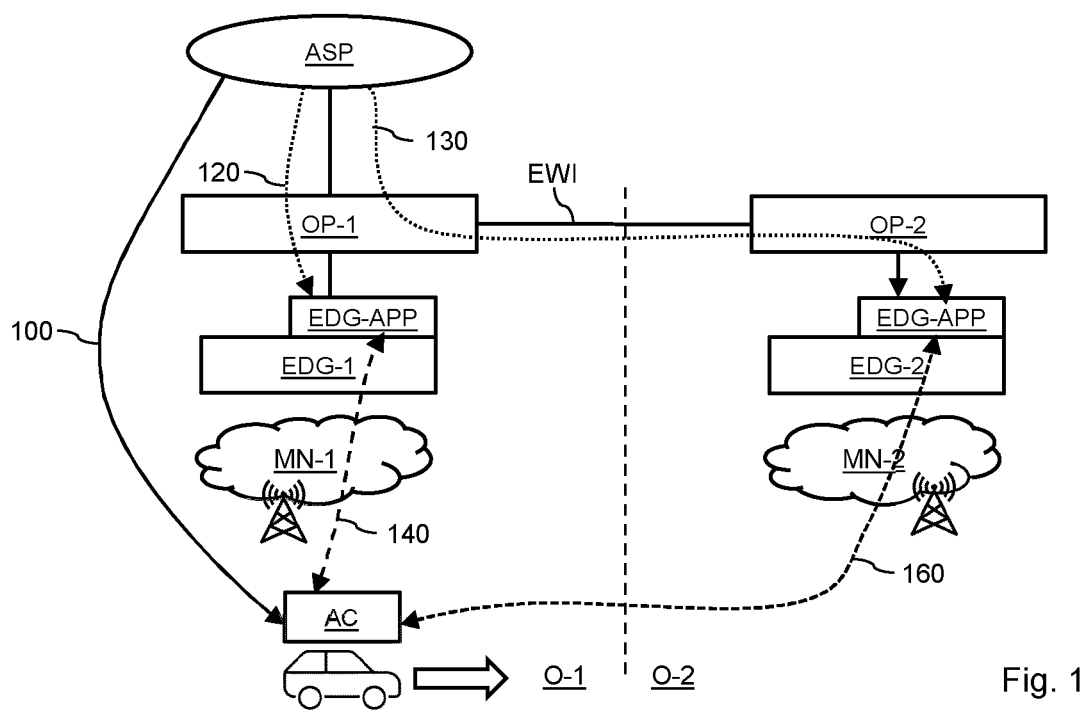
FIG. 1 shows a client device which is part of, or located in, a vehicle, with the vehicle approaching a border crossing which is served at one side by a first mobile network of a first operator and at another side by a second mobile network of a second operator, wherein the client device utilizes an edge application service provided by the first operator, and wherein the edge application service is migrated to the second mobile network of the second operator before or when crossing the border.

It should be noted that items which have the same reference numbers in different figures, have the same structural features and the same functions, or are the same signals. Where the function and/or structure of such an item has been explained, there is no necessity for repeated explanation thereof in the detailed description.

REFERENCE SIGNS LIST

The following list of references and abbreviations is provided for facilitating the interpretation of the drawings and shall not be construed as limiting the claims.
AC application client
ASP application service provider
CDCF client dual connectivity function
CLD client device
CMP cloud management platform
DDCL device dual connectivity layer
ECP edge computing platform
EDCF edge dual connectivity function
EDG-APP edge application
EDG-#X edge #X
EI-#X edge instance #X
EWI east-westbound interface
MN-#X mobile network #X
O-#X operator #X
OP-#X operator platform #X
R-#X radio #X
SIM subscriber identity module
UE user equipment
UEL UE logic
URSP UE route selection policy
1-10 messages/steps in information exchange
100 loading and configuring of client device application
120 loading and configuring of edge app
130 loading and configuring of edge app
140 data connection to edge application on first edge
160 data connection to edge application on second edge
200 northbound interface
210 east-westbound interface
220 southbound interface
230 user-network interface
240 application APIs
300 client device acting as single UE
320, 340 client device acting as two UEs
400 processor system representing client device
410 first radio
420 second radio
430 processor subsystem
440 data storage
500 processor system representing network function
510 network interface
520 processor subsystem
530 data storage
600 computer-readable medium
610 non-transitory data
1000 exemplary data processing system
1002 processor
1004 memory element
1006 system bus
1008 local memory
1010 bulk storage device
1012 input device
1014 output device
1016 network adapter
1018 application

DESCRIPTION OF EMBODIMENTS

The following embodiments may involve providing a client function in a client device, which client device may comprise least two radios for establishing simultaneous mobile data connections to at least two mobile networks. The client device itself may be configured to register with a mobile network and to utilize an edge application service provided by an edge application server of an edge of the mobile network, with the edge being managed by an edge enabling platform of the mobile network. A network function may be provided as an instance in the edge enabling platform of the mobile network, which network function may elsewhere also be referred to as edge dual connectivity function (EDCF). When anticipating a switch to another mobile network, for example due to the client device crossing a country or coverage border, the client function may provide information to the instance of the network function in the mobile network, as well as to another instance of the network function in the other mobile network. The information may comprise an identifier of the client device, an identifier of the edge application service currently utilized by the client device and in some embodiments of an identity of one or both of the edge enabling platforms. Both instances of the network functions may then communicate with each other and cooperatively orchestrate a migration of the edge application service from the mobile network to the other mobile network to support a seamless switching thereto.

Example Involving Device Mobility

The desirability of such orchestration of the migration of edge application services across respective mobile networks may be illustrated by way of the example shown in FIG. 1. Here, a vehicle is shown which may represent or comprise a client device (not explicitly shown in FIG. 1) and which client device may comprise an application client AC. The application client AC may for example be a CCAM application which makes use of an edge EDG-1 of a first mobile network MN-1, and specifically of an edge application service provided by an edge application EDG-APP. The application client AC may, in a step 100, have been loaded onto the client device and configured by an application service provider ASP, while the edge application EDG-APP may, in a step 120, have been loaded on one or more edge nodes of the edge EDG-1 and configured. For that purpose, the application service provider ASP may be connected to the operator platform OP-1 of the first mobile network MN-1, this operator platform being an example of an edge enabling platform. In some examples, the first mobile network MN-1 may be the home network of the client device, in that a user of the client device may have a subscription with the first mobile network MN-1.

As illustrated in FIG. 1, the vehicle may be move and thereby approach a border between one or more cells of the first mobile network MN-1 and one or more cells of a second mobile network MN-2. In some examples, the border may be a country border, while in other examples, the border may be a coverage border within a country ('national border'), e.g., due to incomplete coverage of the first mobile network MN-1. The client device may comprise at least two radios for establishing simultaneous mobile data connections to both mobile networks MN-1, MN-2. When connected to the first mobile network MN-1, the application client AC may utilize the edge application service of the edge application EDG-APP via the first mobile network MN-1 via a data connection 140. When the vehicle is close enough to the border to be in the second mobile network's MN-2 coverage, the client device may establish a data connection with the second mobile network MN-2. As the vehicle crosses and moves further across the border, it may move outside of the first mobile network's MN-1 coverage. Before this occurs, the application client AC may need to switch from sending and receiving application data over the data connection 140 to sending and receiving application data over the data connection 160. Around that time, on the network side, a switch may need to be made from serving the application client AC from the first edge EDG-1 connected to the first mobile network MN-1 to serving the client device application AC from the second edge EDG-2 connected to the second mobile network MN-2. This may involve, in a step 130, timely loading and configuring the edge application EDG-APP on the second edge EDG-2 and in some examples transferring the application state from the first edge EDG-1 to the second edge EDG-2.

Architectural Considerations

Figure 2:
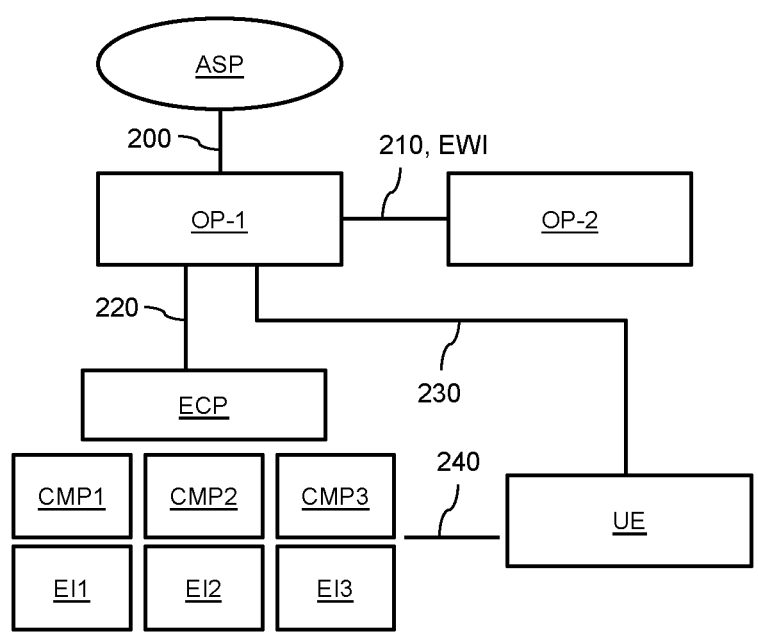
FIG. 2 shows the east/westbound interface between two operator platforms which each have edge instances that provide edge computing to client devices.

With continued reference to the background section of the present specification, architectures for edge computing have been developed by ETSI and in 3GPP and an effort has been made to integrate the results in a single architecture view, see FIG. C.2-1 of [5] (see 'further references'), which figure and definitions of the entities and interfaces shown therein are hereby incorporated by reference. It is said that this single architecture is to support UE-to-edge and edge-to-edge connections. However, besides stating a need for edge-edge connections, edge-to-edge connections are otherwise not addressed in this architecture. Meanwhile, the GSMA work on the Operator Platform (OP) [3], [4] focusses on the federation of edge computing platforms of different mobile operators, with an important role for the east-westbound interface 210, EWI between the different OPs, as shown in FIG. 2. Here, an application service provider ASP is shown, which is to be understood as referring to a system of the ASP, such as a management and/or control system of an ASP, which system may be connected to an operator platform OP-1 via a northbound interface 200. The operator platform OP-1 may be connected to another operator platform OP-2 via an east-westbound interface 210, EWI, via a southbound interface 220 to an edge computing platform ECP, and via a user-network interface 230 to a client device UE. The client device UE may be connected to entities of the edge computing platform ECP via an application API 240. These entities may include cloud management platforms CMPs, which may interact with the edge computing platform, and edge instances EI, the latter referring to instances of edge application servers on respective edge node(s).

As illustrated in FIG. 2, the ASP may typically have a relation with one OP, which OP may be provided by one mobile network operator. However, the footprint of the application managed and/or controlled by the ASP may be extended across other OPs (typically provided by other mobile network operators) by federation through the aforementioned east-westbound interface 210. Thus, in FIG. 2, the ASP may not need to have a direct relation with OP2. However, while [4] states that the east-westbound interface 210 may be used for control/provisioning of edge federation, it may not be used for application traffic, which is defined by [4] as "the application traffic as such flows between the application software at the user device and the application software deployed in the edge nodes". Accordingly, a different way may be needed to set up application data flows between edge instances, including edge application servers that have been instantiated as edge instances, in or connected to different mobile networks.

In accordance with the following embodiments, a network function may be provided for the operator platform, or in general for an edge enabling platform. This network function may be separately instanced in or for a mobile network. If a client device switches from a first mobile network to a second mobile network, for example when it crosses a country border, two instances of the network function which may be provided for the edge enablement platforms of the respective mobile networks may cooperatively prepare the migration of the edge application service for the client device from the first edge application server to a second edge application server of the second mobile network. This network function, and instances of this network function, may be referred to as Edge Dual Connectivity Function (EDCF), with 'dual connectivity' here referring to the dual connectivity of the client device. At the client device, a client function may be provided, which may be referred to as Client Dual Connectivity Function (CDCF), and which may communicate with one or both of the EDCFs so as to provide information to the EDCF(s) to manage the migration between mobile networks.

By way of example, the client device in the following embodiments may be configured to act as so-called User Equipment (UE) of a mobile network which adheres to one or more 3GPP standards. In some embodiments, the client device may also act as two or more of such UEs. Such and similar configurations of the client device will be further discussed with reference to FIGS. 4A-4C. The following embodiments may further refer to various network entities of such a 3GPP-type of mobile network. However, it will be appreciated that the concepts and mechanisms described in this specification may equally apply to any other type of client device and network entities, which may include client devices for use with, and network entities of, non-3GPP mobile networks or fixed networks. The client device may be registered on a 3GPP core network, for example via a Radio Access Network (RAN), which core network may provide connectivity between the UE and edge application servers. The client device may be uniquely identified by a UE identifier (UE ID), such as an GPSI, IMSI, GUTI, S-TMSI or IP address, or in embodiments in which the client device acts as two UEs, by two of such UE IDs. Alternatively, or additionally, the client device may be identified by a Mobile Equipment identifier (ME ID) such as an IMEI or IMEISV.

The edge server architecture may comprise one or more Edge Application Servers (EASs) which provide edge applications services. The EASs may register on an Edge Enabler Server (EES) so that the EES may maintain an overview of the EASs and their applications services. The EASs may be identified by EAS IDs.

The UE may comprise an Edge Enabler Client (EEC) which may have registered with the EES so that the UE's EEC may discover through the EES which EASs are available and which EAS endpoints to use for connecting to an EAS. This mechanism may be used to find an EAS endpoint for a UE-EAS connection.

The UE may have an Application Client (AC), which is elsewhere also simply referred to as 'client (device) application' or 'App', which may be an application that the Application Service Provider (ASP) wishes to run on the client. The Application Client may for example exchange information with the EEC over an EDGE-5 interface.

Figure 3:
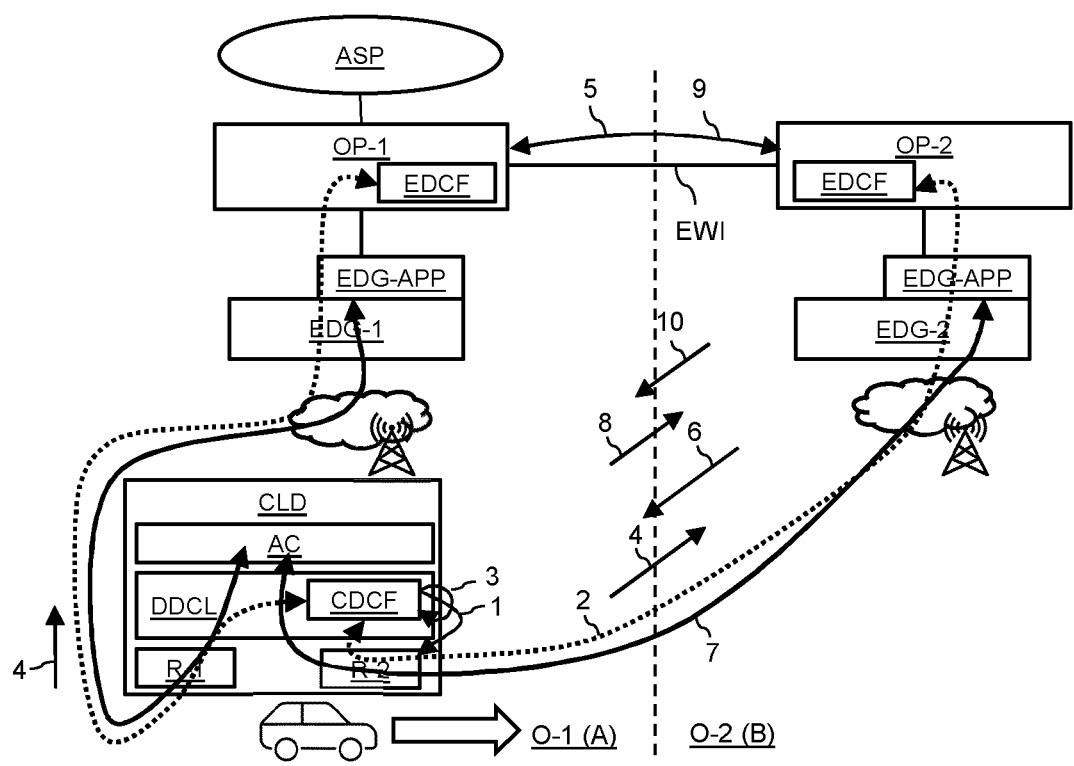
FIG. 3 shows an information exchange by which a migration of an edge application service is prepared, initiated and performed for the example of FIG. 1.

FIG. 3 shows an information exchange by which a migration of an edge application service is prepared, initiated, and performed within the example of FIG. 1. In this example, the involved entities may exhibit the following characteristics:

A client device CLD in the form of a mobile device may use edge application services and roam from a first operator's mobile network in a first country (henceforth also identified by the letter 'A', e.g., as operator A, mobile network A, country A, etc.) to that of a second operator in a second country (henceforth also identified by the letter 'B', e.g., as operator B, mobile network B, country B, etc.).

The application client (AC) on the client device may exchange application data with an edge application (EDG-APP) that is executed on an operator's edge EDG-1. This edge EDG-1 may be under the control of that operator's operator platform OP-1. The application client AC may have been provided to the client device by the application service provider ASP and may have no knowledge of the client device's dual connectivity feature. Namely, the client device CLD may be capable of registering on the two mobile networks simultaneously and setting up simultaneous mobile data connections to these networks. The client device may be equipped with two radios R-1, R-2 to support such dual connectivity to two mobile networks.

The Client Dual Connectivity Function (CDCF) on the client device CLD may manage the dual connectivity on the client device and may be configured to inform instances of the Edge Dual Connectivity Function (EDCF) in an operator platform.

The EDCFs in the operator platforms OP-1, OP-2 may communicate via an east/westbound interface EWI between the operator platforms.

Initially, the client device CLD may only be registered with operator A's mobile network using a first radio R-1 and may be moving towards the border between country A and B and, consequently, expected to move out of the coverage of the mobile network A. The client device may have two active data connections via the first radio R-1 over mobile network A: an application data connection between the application client AC and the edge application EDG-APP (full line) and a signaling connection between the CDCF of the client device and the EDCF in operator A's OP-1 (dashed line). The information exchange in FIG. 3 may involve the following steps, which steps may correspond to respectively numbered arrows in FIG. 3:

1. When the client device CLD enters mobile network B's coverage, the CDCF may trigger the client device's second radio R-2 to register with network B.
2. The second radio R-2 may register with the mobile network B and may setup a signaling connection to the EDCF in operator B's OP-2 (dashed line).
3. The CDCF may determine a unique device identifier for the client device. This device identifier may be, for example, a long-enough random string, or a hash of an IMSI, GSPI or IMEI. In general, the device identifier may comprise a UE-ID or a ME-ID as described elsewhere in this specification. In general, the CDCF may generate an anonymized or pseudonymized version of any existing identifier.
4. The CDCF may send the device identifier to the EDCFs on both operator platforms, together with an application identifier of the edge application EDG-APP which is being utilized on the edge EDG-1. In some embodiments, the CDCF may also send operator identifiers of operator A and B to the EDCFs. For example:
   a. The CDCF may sends the operator identifier of operator B to the EDCF of operator A, and may send the operator identifier of operator A to the EDCF of operator B.
   b. The CDCF may send both operator identifiers to both EDCFs.
   c. The CDCF may not send any operator identifiers to the EDCFs, but instead a centralized database may be maintained which links device identifiers to operator identifiers and which database may be accessible by both EDCFs. If an EDCF receives a device identifier, it may generate an entry in the database, with the entry linking the aforementioned device identifier to the EDCF's operator. By looking-up other entries linked to that device identifier, both EDCFs may identify the other operator.

As also noted elsewhere, instead of using operator identifiers, also operator platform identifiers may be used, or in general identifiers of the respective edge enabling platforms which comprise or are connected to the respective EDCFs.

5. The two operator platforms OP-1, OP-2 may prepare the migration of the edge app EDG-APP from operator A's edge EDG-1 to an edge EDG-2 of operator B, according to known procedures and known interactions between the edges connected to operator A's and operator B's networks. For example, the east/westbound interface EWI between the operator platforms OP-1, OP-2 may be used to coordinate the migration. In some embodiments, the edge EDG-2 may be selected based on the base station involved in the signaling connection. For example, the edge EDG-2 may be selected as one or more edge nodes being in physical proximity or network proximity (e.g., in terms of number of hops, latency, etc.) of the base station.

6. During the preparation, the operator B's EDCF may instruct the client device CLD to set up the application data connection between the application client AC and the new edge EDG-2, and more specifically, the edge app EDG-APP.

7. The client device CLD may set up the new application data connection to the edge app EDG-APP (full line).

8. When the CDCF expects or notices a degradation of the quality of the connectivity to mobile network A as the client device CLD moves out of network A's coverage, the CDCF may request operator B's EDCF to initiate the migration.

9. Operator B's OP-2 may initiate the migration using known procedures, involving an interaction with operator A's OP-1.

10. After the migration has been completed, operator B's EDCF may instruct the CDCF to clean up the data and signaling connections associated with mobile network A and to deregister from mobile network A.

With respect to preparing and initiating the migration, e.g., as described in steps 5 and 9 respectively, it is noted that known types of edge migration mechanisms may be used for such preparing and initiating of the migration, e.g., as described in [6] or using the Application Context Relocation (ACR) described in [5]. While these mechanisms are not described for a dual connectivity device switching between mobile networks, such mechanisms may nevertheless be applied in the present context.

Various alternatives to the embodiment shown in FIG. 3 exist, as well as in general various implementation options. The following discusses some of these alternative embodiments and various implementation options.

For example, as shown in FIG. 3, the CDFC may provide the client identifier and application identifier to both EDCFs. However, in some embodiments, the CDFC may provide the client identifier and application identifier to only one of the EDCFs, with the EDCF forwarding the client identifier and application identifier to the other EDCF. In some embodiments, the CDFC may in fact only or mainly communicate with the EDCF of the new mobile network (e.g., second mobile network or network 'B') and not or less with the EDCF of the previous mobile network ($1^{st}$, 'A'), leaving the task of informing the EDCF of the previous mobile network to the EDCF of the new mobile network.

As another example, the CDFC may be part of a new device layer, which may be referred to as device dual connectivity layer (DDCL). The DDCL may comprise the CDFC but may also contain other functions associated with dual connectivity, for example a further function that compares the signal strengths of the two radios to allow determining when to set up a new connection to a mobile network and when to switch between mobile networks. The functionality of this further function was previously described with reference to FIG. 3, namely in steps 1 and 7. In some examples, the CDCF itself may implement this further function. In general, while the above and following refers to a client device with two radios, a client device may also be equipped with more than two radios to establish multi connectivity. It will be appreciated that any example in the context of dual connectivity may equally apply to multi connectivity.

Furthermore, there exist various mapping of entities to 3GPP's EdgeApp architecture. The CDCF, the device's dual connectivity layer DDCL and EDCF may for example be included in or combined with functions in the EdgeApp architecture from 3GPP TS 23.558 [5]. In some specific examples:

The CDCF may be included or combined in the Edge Enabler Client (EEC). For example, the EEC may implement part or all of the device dual connectivity layer DDCL of FIG. 3.

The EDCF may be included or combined in an Edge Enabler Server (EES) or an Edge Configuration Server (ECS).

The edge application EDG-APP providing the edge application service may be executed on an Edge Application Server (EAS).

The East/Westbound interface between operator platforms may be implemented as the EDGE-9 interface between EESs.

The interface between CDCF and EDCF may be implemented as the EDGE-1 interface between EEC and EES. Alternatively, the interface between CDCF and EDCF may be implemented as the EDGE-4 interface between EEC and ECS.

Figure 4A:
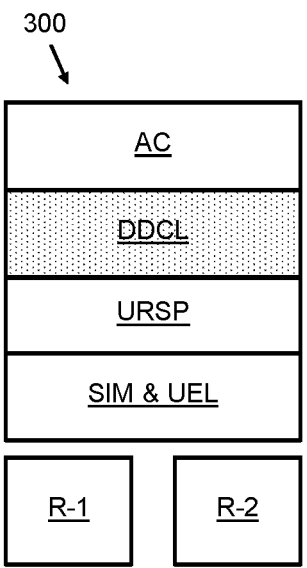
FIGS. 4A-4C show different architectures of the client device, with FIG. 4A showing the client device acting as one UE with a set of credentials and UE identifier, FIG. 4B showing the client device acting as two UEs each with their own set of credentials and UE identifiers, and FIG. 4C resembling FIG. 4B but further showing each UE having a separate instance of a device dual connectivity layer.
Figure 4B:
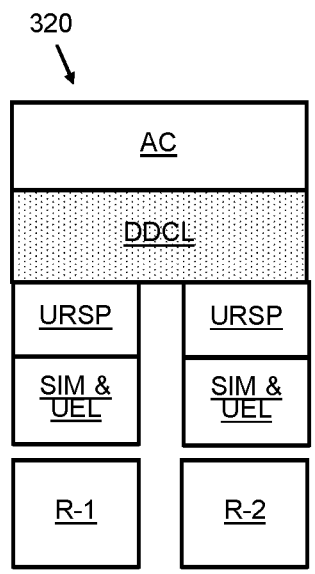
Figure 4C:
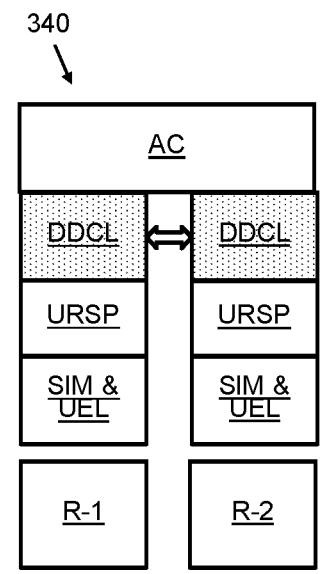

Another example is that the client device may act as one or two UEs, as also illustrated in FIGS. 4A-4C. Here, FIG. 4A shows the client device acting as one UE with a set of credentials and UE identifier, which is illustrated in FIG. 4A by, in addition to the application client AC, one dual device connectivity layer (DDCL) and two radios (R-1, R-2), there being one UE route selection policy (URSP), one subscriber identity module (SIM) and one instance of other UE logic (UEL). Alternatively, as shown in FIG. 4B, the client device may act as two UEs each with their own set of credentials and UE identifiers, which is illustrated in FIG. 4B by there being separate URSPs, SIMs and UELs for each UE. In yet another example, as shown in FIG. 4C, the client device may act as two UEs but may have separate instances of dual device connectivity layers (DDCL). Compared to FIG. 4B, where there may be one instance of the DDCL, the client device may here comprise two UEs which are more 'self-contained' as they each, in addition to the URSP, SIM and other UE logic, and radio, also each contain a separate DDCL but with the DDCLs being configured to communicate with each other.

In some examples, the CDCF may not only communicate with the EDCFs, but also determine when to set up a new connection to a mobile network and when to switch between mobile networks. This determining functionality was previously described with reference to FIG. 3, namely in steps 1 and 7, but may be optional functionality of the CDCF. If the CDCF is configured to determine when to set up a new connection to a mobile network and when to switch between mobile networks, such a decision may be based criteria such as signal strength to one or both mobile networks but may additionally or alternatively also use other types of information. For example, one or more of the following may be taken into account: a geolocation of the client device (e.g., indicating whether a client device is near or far from a cell of a mobile network), a planned or estimated route of the client device (e.g., indicating when and/or where the client device enters or leaves network coverage of a particular mobile network), whether a broadcast is received signaling a country border (e.g., indicating a need to switch between mobile networks), and whether a base station to which the client device is connected is known to be a base station at or within a vicinity of a country border. With continued reference to FIG. 3, such additional information may be taken into account in steps 1 and 7. For example, if the client device is still relatively far away from the border, the connection might not be transferred yet to the second mobile network. However, once the CDCF determines that the client device is near the border (e.g., based on its geolocation), the CDCF may set the migration into effect.

While the switching between mobile networks has elsewhere mainly been described due to the client device crossing a national border ('cross-border roaming'), such switching may also be employed nationally ('national roaming'). For example, the two different operators may be from the same country rather than from two different countries, and the need to switch may for example be due to differences in national coverage (e.g., the client device may normally connect to its home network, except in regions the home network has no or insufficient coverage). It is noted that from a technical perspective, the FIG. 3 embodiment also applies to national roaming. However, there may be commercial considerations, such as a need for a national roaming agreement between operators to allow for such national roaming.

In general, the device dual connectivity layer including its functions (such as the CDCF) may be implemented in an operating system, such as mobile operating system including but not limited to Android by Google or iOS by Apple.

Figure 5:
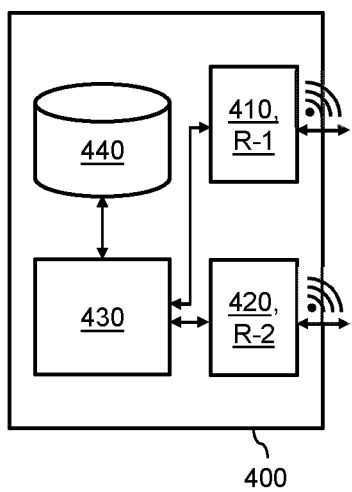
FIG. 5 shows a processor system which may be exemplary for a client device, with the processor system comprising two radios for establishing simultaneous mobile data connections to at least two mobile networks.

FIG. 5 shows a processor system 400 which may be exemplary for the client device described in this specification, and which may in the following also be simply referred to as client device 400. The client device 400 may comprise a first radio R-1 and a second radio R-2 for simultaneously connecting to two mobile networks. Each of the radios may for example be a 5G or next-gen ('6G', etc.) radio for connecting to a 5G or next-gen mobile network adhering to one or more 3GPP standards. In a typical embodiment, both radios may be of a same type (e.g., a same type of 5G radio), but both radios may also be of different types. Although not shown explicitly in FIG. 5, the client device 400 may also comprise an antenna or antenna connection for each radio.

The client device 400 may further comprise a processor subsystem 420 which may be configured, e.g., by hardware design or software, to perform the operations described in this specification in as far as pertaining to the client device or UE(s). In general, the processor subsystem 420 may be embodied by a single Central Processing Unit (CPU), such as a x86 or ARM-based CPU, but also by a combination or system of such CPUs and/or other types of processing units, such as Graphics Processing Units (GPUs). The client device 400 is further shown to comprise a data storage 440 which may for example comprise volatile random-access memory or non-volatile solid-state memory, which may be used by the client device 400 to store data, for example to store data to be sent to, or received from, the edge application server.

In general, the client device 400 may be embodied by a (single) device or apparatus, e.g., a smartphone, personal computer, laptop, tablet device, gaming console, set-top box, television, monitor, projector, smart watch, smart glasses, media player, media recorder, etc. In some examples, the client device 400 may act as one or more UEs of a mobile telecommunication network, such as a 5G or next-gen mobile network. In some examples, the client device 400 may be embodied by a (distributed) system of devices, such as a combination of two mobile devices each having a radio.

Figure 6:
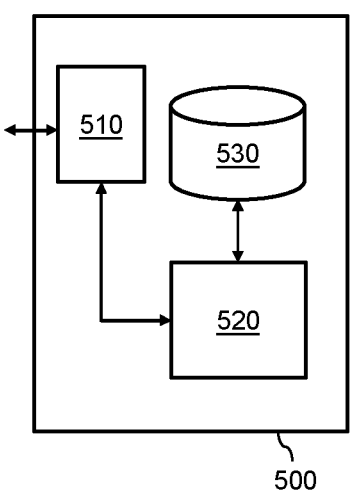
FIG. 6 shows a processor system which may be exemplary for a network node or system of network nodes configured to implement a network function.

FIG. 6 shows a processor system 500 which may be configured to provide an instance of the network function (e.g., the EDCF) described in this specification, meaning that the processor system 500 may implement such a network function. The processor system 500 may comprise a network interface 510 for data communication with a mobile network and with entities associated with the mobile network, such as an edge enabling platform or operator platform. The network interface 510 may for example be a wired communication interface, such as an Ethernet or fiber-optic based interface, to a fixed (e.g., non-mobile) part of the mobile network. Alternatively, the network interface 510 may be a wireless communication interface, e.g., being of a type as described for the client device 400 of FIG. 5. In yet other examples, the processor system 500 may be a subsystem of a larger system, e.g., a supra-system implementing several network functions. In such cases, the network interface 510 may be an internal interface of the supra-system, for example a virtual, software-based network interface.

The processor system 500 may further comprise a processor subsystem 520 which may be configured, e.g., by hardware design or software, to perform the operations described in this specification in as far as pertaining to the entity that the processor system is embodying, e.g., the network node or system of network nodes implementing the network function. In general, the processor subsystem 520 may be embodied by a single Central Processing Unit (CPU), such as a x86 or ARM-based CPU, but also by a combination or system of such CPUs and/or other types of processing units. In embodiments where the processor system 500 is distributed over different entities, e.g., over different servers, the processor subsystem 520 may also be distributed, e.g., over the CPUs of such different servers. As also shown in FIG. 6, the processor system 500 may comprise a data storage 530, such as a hard drive, a solid-state drive, or an array of such hard and/or solid-state drives, etc., which may be used to store data. In some examples, the processor system 500 may be implemented by a network node, or by a system of network nodes jointly providing the network function.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. In general, each functional unit of a respective entity may be implemented in the form of a circuit or circuitry. A respective entity may also be implemented in a distributed manner, e.g., involving different devices or apparatus.

Figure 7:
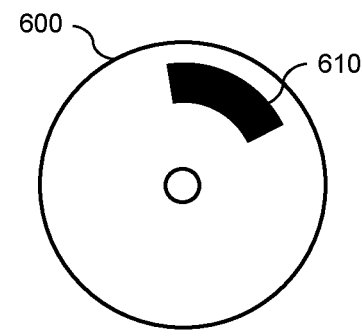
FIG. 7 shows a non-transitory computer-readable medium comprising data.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 600 as for example shown in FIG. 7, e.g., in the form of a series 610 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 7 shows by way of example an optical storage device 600.

Figure 8:
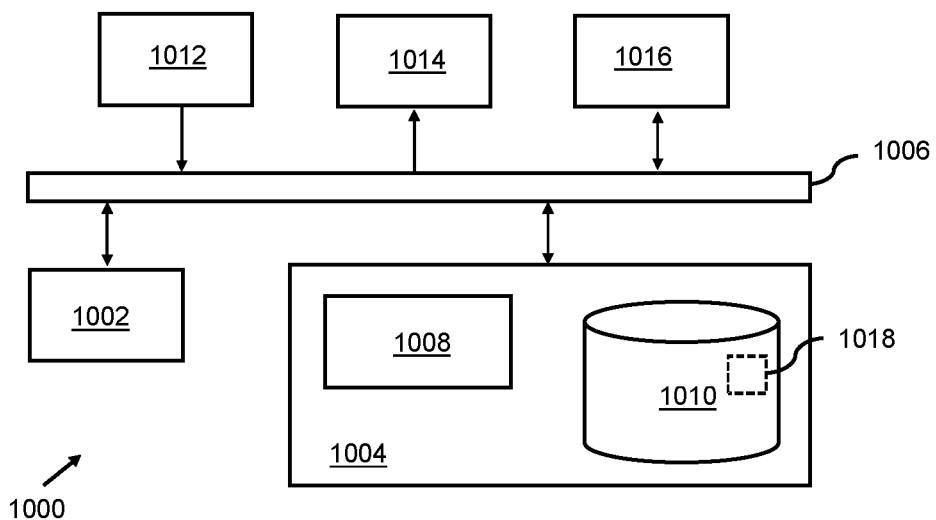
FIG. 8 shows an exemplary data processing system.

FIG. 8 is a block diagram illustrating an exemplary data processing system 1000 that may be used in the embodiments described in this specification. Such data processing systems include data processing entities described in this specification, including but not limited to the client device including its client function CDCF and any network node or system of network nodes implementing the network function (e.g., the EDCF). The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Radios, modems, cable modems, and ethernet cards are examples of different types of network adapter that may be used with data processing system 1000.

As shown in FIG. 8, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a client device as described in this specification. In that case, application 1018 may represent an application that, when executed, configures data processing system 1000 to perform the functions described with reference to the client device. In another example, data processing system 1000 may represent an embodiment of a network function (e.g., EDCF) as described in this specification. In that case, application 1018 may represent an application that, when executed, configures data processing system 1000 to perform the functions described with reference to the network function.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A client device for a mobile network, the client device comprising:
   at least two radios for establishing simultaneous mobile data connections to at least two mobile networks;
   a processor subsystem configured to, using a first radio, register with a first mobile network and utilize an edge application service provided by an edge application server of an edge of the first mobile network, wherein the edge is managed by an edge enabling platform of the first mobile network;
   wherein the processor subsystem is further configured to:
   i) using a second radio, register with a second mobile network, and after registering with the second mobile network using the second radio, establish a signaling connection to at least one instance of a network function which network function is instanced as a first instance in the edge enabling platform of the first mobile network and as a second instance in an edge enabling platform of the second mobile network, wherein both instances are configured to communicate with each other and to cooperatively orchestrate a migration of edge application services across respective mobile networks;

ii) provide a client identifier of the client device and an application identifier of the edge application service to the at least one instance of the network function to enable both instances to cooperatively prepare the migration of the edge application service for the client device from the first edge application server to a second edge application server of the second mobile network;

iii) if one or more criteria are met for switching to the second mobile network, request the at least one instance of the network function to, cooperatively with the other instance, initiate the migration to the second edge application server; and iv) after the migration has been completed, switch from utilizing the edge application service from the first edge application server to utilizing the edge application service from the second edge application server.

2. The client device according to claim 1, wherein the processor subsystem is configured to, using the second radio, provide the client identifier and the application identifier to the second instance of the network function and to provide a first platform identifier of the edge enabling platform of the first mobile network to the second instance to enable the second instance to locate the first instance.

3. The client device according to claim 1, wherein the processor subsystem is configured to, using the first radio, provide the client identifier and the application identifier to the first instance of the network function and to provide a second platform identifier of the edge enabling platform of the second mobile network to the first instance to enable the first instance to locate the second instance.

4. The client device according to claim 1, wherein the processor subsystem is configured to provide the client identifier and the application identifier to both instances of the network function via the respective radios.

5. The client device according to claim 1, wherein the processor subsystem is configured to execute a client function which is configured for performing steps i) through iv).

6. The client device according to claim 5, wherein the client function is part of an edge enabler client of the client device or distributed over two or more edge enabler clients of the client device.

7. The client device according to claim 5, wherein the client device is configured as one of:
a mobile network user equipment comprising one subscriber identity module and at least two radios; or
a combination of at least two mobile network user equipment each having one subscriber identity module and a radio, wherein the client function is configured to communicate with each mobile network user equipment.

8. A network node or system of network nodes configured to establish an instance of a network function for an edge enabling platform of a mobile network, wherein the mobile network comprises or is connected to an edge for providing edge application services to client devices, wherein the edge is managed by the edge enabling platform, the network node or system of network nodes comprising:
a network interface to the mobile network;
a processor subsystem configured to, as the network function:
receive, from a client device having at least two radios and supporting simultaneous mobile data connections to the mobile network and another mobile network, a client identifier of the client device and an application identifier of an edge application service utilized by the client device in the other mobile network;
select a part of the edge of the mobile network to host an edge application server for providing the edge application service to the client device;
establish communication with another instance of the network function in an edge enabling platform of the other mobile network;
together with the other instance of the network function, cooperatively prepare and subsequently initiate a migration of the edge application service for the client device from another edge application of the other mobile network to the edge application server of the mobile network.

9. The network node or system of network nodes according to claim 8, wherein the processor subsystem is configured to select the part of the edge to be in a proximity of a base station to which the client device is connected.

10. The network node or system of network nodes according to claim 8, wherein the processor subsystem is configured to communicate with the other instance of the network function via an east-westbound interface between the mobile network and the further mobile network.

11. The network node or system of network nodes according to claim 8, wherein the processor subsystem is configured to:
receive a platform identifier of the edge enabling platform of the other mobile network from the client device; and
locate the other instance of the network function based on the platform identifier.

12. The network node or system of network nodes according to claim 8, wherein the processor subsystem is configured to:
look up a platform identifier of the edge enabling platform of the other mobile network in a database on the basis of the client identifier, wherein the database is accessible to entities outside of the mobile network and stores entries associating client identifier and platform identifier; and
locate the other instance of the network function based on the platform identifier.

13. The network node or system of network nodes according to claim 8, wherein the processor subsystem is configured as an edge enabler server or an edge configuration server, wherein the edge enabler server or the edge configuration server comprises the instance of the network function.

14. A computer-implemented method for execution at a client device, the client device comprising at least two radios for establishing simultaneous mobile data connections to at least two mobile networks, wherein the client device is configured to, using a first radio, register with a first mobile network and utilize an edge application service provided by an edge application server of an edge of the first mobile network, wherein the edge is managed by an edge enabling platform of the first mobile network;
wherein the method comprises, by the client device:
using a second radio, registering with a second mobile network, and after registering with the second mobile network using the second radio, establishing a signaling connection to at least one instance of a network function which network function is instanced as a first instance in the edge enabling platform of the first mobile network and as a second instance in an edge enabling platform of the second mobile network, wherein both instances are configured to communicate with each other and to cooperatively orchestrate a migration of edge application services across respective mobile networks;

providing a client identifier of the client device and an application identifier of the edge application service to the at least one instance of the network function to enable both instances to cooperatively prepare the migration of the edge application service for the client device from the first edge application server to a second edge application server of the second mobile network;

if one or more criteria are met for switching to the second mobile network, requesting the at least one instance of the network function to, cooperatively with the other instance, initiate the migration to the second edge application server; and after the migration has been completed, switching from utilizing the edge application service from the first edge application server to utilizing the edge application service from the second edge application server.

15. A computer-implemented method for execution at a network node or system of network nodes, wherein the network node or system of network nodes is configured to establish an instance of a network function for an edge enabling platform of a mobile network, wherein the mobile network comprises an edge for providing edge application services to client devices, wherein the edge is managed by the edge enabling platform, wherein the method comprises, as the network function:

receiving, from a client device having at least two radios and supporting simultaneous mobile data connections to the mobile network and another mobile network, a client identifier of the client device and an application identifier of an edge application service utilized by the client device in the other mobile network;

selecting a part of the edge of the mobile network to host an edge application server for providing the edge application service to the client device;

establishing communication with another instance of the network function in an edge enabling platform in the other mobile network;

together with the other instance of the network function, cooperatively preparing and subsequently initiating a migration of the edge application service for the client device from another edge application in the other mobile network to the edge application server in the mobile network.

16. A non-transitory computer-readable medium comprising data representing a computer program, the computer program comprising instructions for causing a processor system to perform the method according to claim 14.

* * * * *